July 29, 1958  C. A. KRONHOLM  2,844,846
PLASTIC FILM EXTRUDER

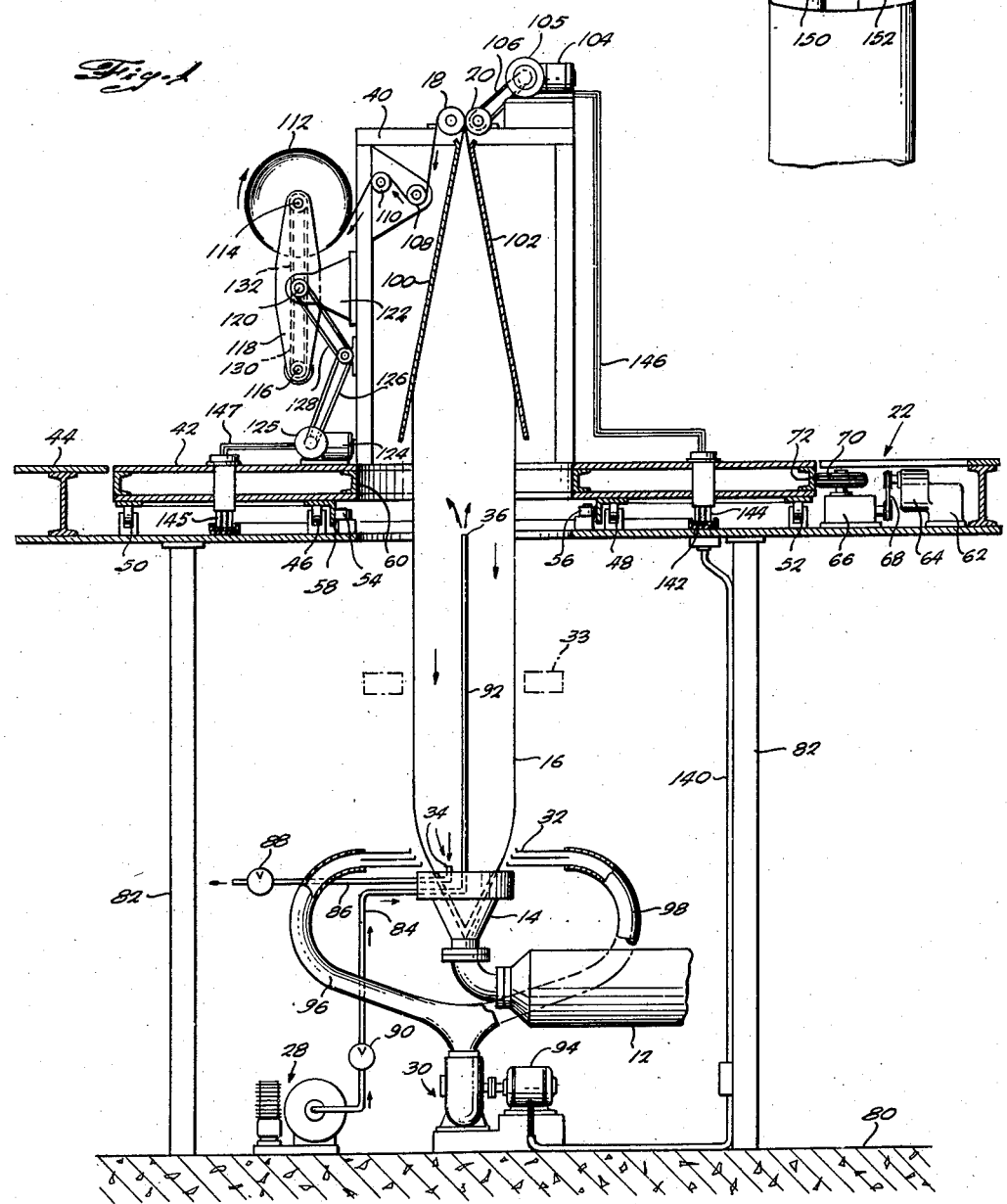

Filed Sept. 2, 1954  2 Sheets-Sheet 2

INVENTOR
CARL A. KRONHOLM
BY
James and Franklin
ATTORNEYS.

United States Patent Office 2,844,846
Patented July 29, 1958

2,844,846

PLASTIC FILM EXTRUDER

Carl A. Kronholm, Yonkers, N. Y., assignor to Chester Packaging Products Corp., Yonkers, N. Y., a corporation of New York Application September 2, 1954, Serial No. 453,872

6 Claims. (Cl. 18—14)

This invention relates to plastics film extrusion, and more particularly to improved apparatus and methods for making the same.

It is already known to provide a plastic film by extruding a plastics material to form a tube which later is pinched between pinch rollers, the said tube being inflated to expand the same to desired diameter by maintaining a body of air between the extrusion die and the pinch rollers, and the material being cooled to set the same by blowing a ring or sleeve of air against the outside of the expanded tube.

But such methods involve certain difficulties in that certain irregularities in the thickness of the tubing at various points around its circumference as compared with other points occur from several causes, which have not heretofore been fully and satisfactorily overcome, and thus these irregularities, or at least some of the serious ones, will pass straight on between the pinch rollers and the flattened tubing when it is wound up on a reel to form a roll of irregular or conical shape. Such irregularities occur because of different conditions in the plastic at different points in the extruder and because of differences at different points around on the annular extruding orifice. Also, serious irregularities may occur because of differences occurring at different points around on the blowing ring.

These difficulties according to the present invention are overcome by rotating the pinch roller and wind up means as an assembly about the axis of the extruded tubing in case the blowing ring and extruder are kept stationary against rotation about such axis, or if it is desired to retain the pinch roller and wind up assembly stationary against such rotation, then an assembly comprising the extruder together with the blowing ring are rotated about said axis.

A further difficulty with the prior process is that the setting of a plastic material may differ at an earlier time relative to a later time, and may differ on the outside of the film relative to the inside of the film. I have found that these difficulties arise because the air trapped inside the tube is static, and soon increases in temperature as it absorbs heat from the film. This is in contrast with the delivery of a large supply of fresh cooling air on the outside of the tube. To overcome this difficulty, I utilize a changing or circulating body of air inside the tube, instead of a stationary body of air. With this object in view I provide an air outlet as well as an air inlet through the die, and the diameter of the inflated tube then depends on a suitable adjustment of the relative rates of flow through the inlet and outlet. The inlet and outlet are preferably displaced from one another longitudinally of the tube for a substantial distance, thereby insuring circulation of the air within the tube.

To accomplish the foregoing general objects, and other more specific objects which will hereinafter appear, my invention resides in the plastic film extrusion apparatus, and the elements thereof inter-related as hereinafter described. The following specification is accompanied by drawings, in which:

Fig. 1 is a largely schematic elevation, partly in section, through a plastic film extrusion apparatus embodying features of my invention;

Fig. 2 is a fragmentary perspective view of a gasseted tube;

Figure 3:
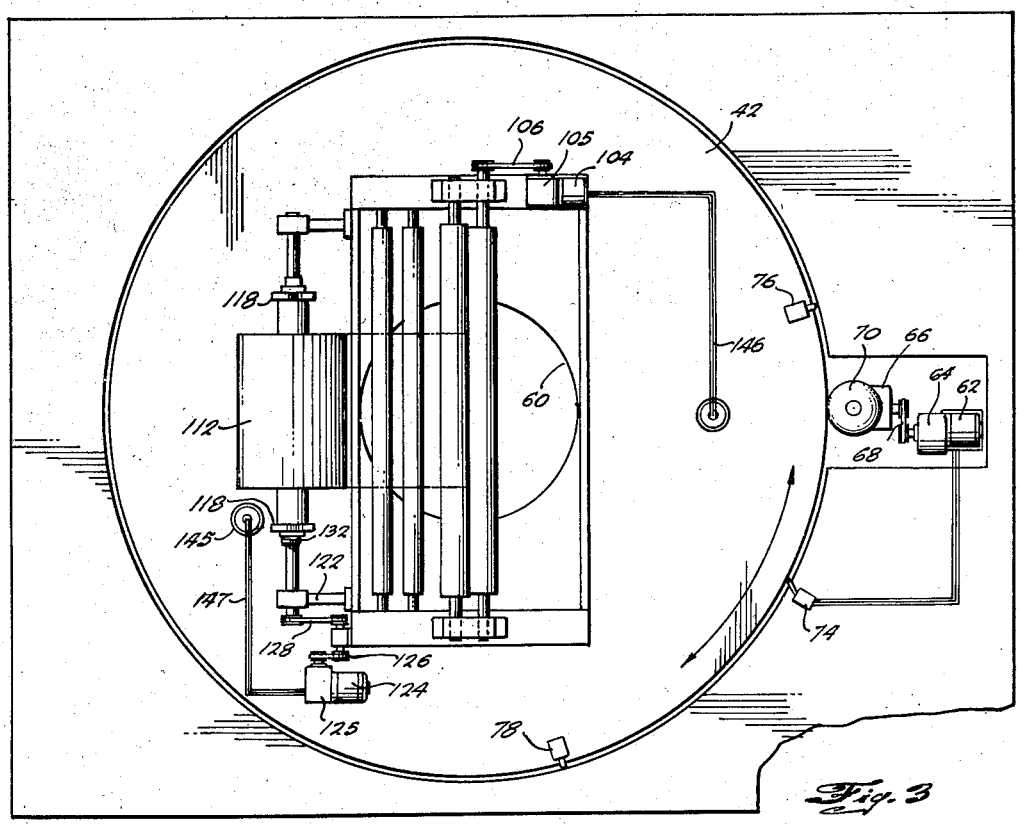
Fig. 3 is a plan view of the apparatus.

Referring to the drawing, and more particularly to Fig. 1, I there show a plastic film extrusion apparatus comprising an extruder 12 connected to a die 14 to form the plastic material into a thin-walled tube 16. This tube is later flattened between pinch rollers 18 and 20, which are spaced from the die, and are preferably located above the die. I further provide mechanism, generally designated 22, to slowly revolve the pinch rollers 18, 20 relative to the die 14, about the axis of the tube 16. There is also a means, generally designated 28, to supply air through the die 14 to the inside of the tube 16, in order to inflate and expand the tube to a desired diameter.

I further provide a means, generally designated 30, to blow a ring or sleeve of cooling air around the tube, said air being fed through an appropriate annular nozzle system 32. The latter is preferably made stationary, thus facilitating the problem of supplying air thereto. Similarly the connections for supplying air from the compressor 28 to the inside of the tube are simplified by the fact that the die is stationary. In accordance with a feature of my invention, I provide an outlet 34 as well as an inlet 36, and these are preferably substantially spaced from one another longitudinally of the tube, thus insuring a change of air within the tube.

Considering the arrangement in greater details, the pinch rollers 18, 20 are mounted on a frame 40 which is carried on a turntable 42. The latter is preferably flush with one floor 44 of the plant, in order to facilitate the removal of rolls of finished material. The turntable 42 is supported on two rings of rollers, the inner ring being indicated at 46, 48, and the outer ring at 50, 52. It is further supported against radial movement by a ring of rollers 54, 56, the axes of which are vertical, and which bear against the inside of a ring 58 secured at the bottom of the platform. The central part of the platform is cut away with a large opening 60, and the tube 16 ascends through this opening.

The platform is revolved very slowly by means of a motor 62, preferably having built-in reduction gearing 64. This is connected to a further reduction gear train housed at 66, as by means of a belt 68, and the said gear train finally terminates in a wheel 70 which bears against the rim 72 of the turntable. The wheel 70 is preferably made of a frictional material such as rubber, and I prefer to employ an inflatable rubber tire, so that the desired drive friction may be maintained by proper inflation of the pneumatic tire.

As so far described, the turnable would revolve in only one direction. However, the motor 62 is a reversing motor, and referring to Fig. 3 of the drawing, the motor may be reversed by manipulation in one direction or the other of a reversing switch 74. The turntable 42 may be provided with one or two actuating fingers 76 and 78 to operate the switch 74. In the condition shown in Fig. 3 the fingers 76 and 78 are about ninety degrees apart, thus causing the turntable to oscillate back and forth over an arc of about ninety degrees. When the finger 76 reaches the switch 74 it shifts the switch and thus reverses the motor, until later the finger 78 reaches the switch, whereupon it shifts the switch back to original position, thus again reversing the motor, and so on.

Oscillation, in contradistinction to continuous rotation of the turntable, may be desired even when making a flat tube, but it is particularly desirable when working with a more complex tube, such as the gusseted tube shown in Fig. 2. This is initially a cylindrical tube, as previously described, but before reaching the pinch rollers it is guided inward at diametrically opposite points to form gussets, as shown at 150 and 152. Such a gusseted tube may be used in the manufacture of bags or the like.

It will be understood that the angle through which the turntable is revolved may be varied by simply changing the location of the fingers 76 and 78 (Fig. 3). For this purpose a series of appropriately located holes may be provided on the turntable, so that the fingers may be shifted and secured in any new desired position. Moreover, it will be understood that by removing one finger and leaving only one finger, the turntable will be oscillated through an angle of three hundred sixty degrees.

The extrusion apparatus is located on a stationary lower floor 80 (Fig. 1). The support of the upper floor may be strengthened at the turntable by the use of an appropriate group of lally columns 82. The extruder 12 may be conventional, and requires no detailed description other than to briefly mention that it comprises the usual hopper to receive a supply of the plastic being used. From the hopper the material descends to a heated passage in which a power driven screw revolves to force the material as it is being fused toward the die 14. The die is generally conventional and has an annular passage through which the material is extruded, but the die differs in having the inlet and outlet connections previously referred to. The inlet is connected to pipe 84 and thence to the compressor 28. It may equally well be connected to a main storage tank of compressed air, as where such air is anyway available in the plant as a part of its regular equipment. The outlet is connected through pipe 86 to a valve 88 and thence to an open end. The inlet pipe 84 may, if desired, be equiped with a valve 90. It will be understood that by appropriately regulating the valves, the diameter to which the tube is expanded may be controlled.

The inlet and outlet are preferably spaced longitudinally of the tube, and this is most simply done by connecting a rather long vertical pipe 92 to either the inlet or the outlet. In the present case it is connected to the inlet, and thus the fresh air is admitted near the upper end of the tube while the used air is discharged through a point near the bottom of the tube, but the reverse arrangement may be employed.

While not so shown in the drawing, which is largely schematic, it will be understood that the extruder may be and preferably is water cooled, for which purpose a circulating supply of water is fed to and removed from the extruder, all in accordance with conventional practice.

The cooling air is supplied from a blower 30 driven by a motor 94. The discharge of the blower is appropriately divided and guided through a suitable number of branch connections 96 and 98. In practice I have used four such branch connections in order to help insure equal or uniform distribution of air. The air is supplied to an annular nozzle or air ring 32. This could be a circular tube provided with a ring of closely spaced holes to emit jets of air, but I find it preferable to employ one or more annular nozzles which are continuous rather than interrupted. There are one or more horizontal partitions to provide two or more annular rings of air, which flow inward and upward around the tube 16, and which serve to cool and set the same at the desired diameter.

An additional cooling element may be provided, as is schematically indicated at 33 in Fig. 1. Ordinarily, however, the cooling element at 32 is sufficient.

As the tube approaches the pinch rollers 18 and 20 it is preferably preliminarily formed or flattened by convergent forming plates 100 and 102. These are fixedly mounted in the frame 40 which carries the pinch rollers. The pinch rollers are driven by a motor 104 through appropriate reduction gearing and a drive 106. The reduction gear is preferably a variable speed drive. The resulting flattened tube is bent around one of the pinch rollers, in this case the roller 18, to an idler roller 108, and thence to a lead-in roller 110, from which the flattened tube is wound into a roll indicated at 112.

In order to keep the process continuous, provision is made for a quick change from one wind-up mandrel to another. Specifically, there are two mandrels 114 and 116 carried between the ends of spaced arms 118, which in turn are carried on a shaft 120 supported between bearings 122. It will be evident that after a completed roll has been unloaded from the lower mandrel, the arms 118 may be turned one hundred and eighty degrees in clockwise direction, thus shifting the growing roll from the upper position to the lower position, where it continues to receive the folded web. In the meantime the other mandrel is moved to top position, and when the roll at the bottom has grown to desired size, the web is cut and immediately started on the top mandrel. Thereafter the completed bottom roll is leisurely unloaded and carted away, following which the arms 118 are again turned to move the growing roll from upper to lower position.

The mandrels are frictionally driven to provide slippage in order to compensate for the change in diameter of the roll as it grows in size. In the present case the roll is driven by a motor 124 and a variable speed drive 125, connected through belt drives 126 and 128, to pulleys centered on shaft 120, which pulleys are themselves connected through belts 130 and 132, to the mandrels 114 and 116. With this arrangement the mandrels are driven by the motor 124 regardless of whether in upper or lower position.

The motors 104 and 124 are carried by and revolve with the turntable 42. In order to supply the same with power a suitable slip ring system or trolley system is employed. In the present case the power, preferably three-phase, is fed through a conduit 140 to conductors arranged as a multiple circular track 142. A multiple brush system 144 engages the multiple track 142, and supplies power through conductors 146 to the motor 104. A multiple brush system 145 supplies power through conductors 147 to motor 124.

It will be understood that relative rotation of the assembly of means at the top of the apparatus with respect to the assembly comprising the extruder and blowing ring at the bottom, is what is required fully to overcome the difficulties, and that accordingly it is possible to rotate the extruder-blowing ring assembly with respect to the tube axis instead of rotating the pinch roller wind up assembly.

Figure 4:
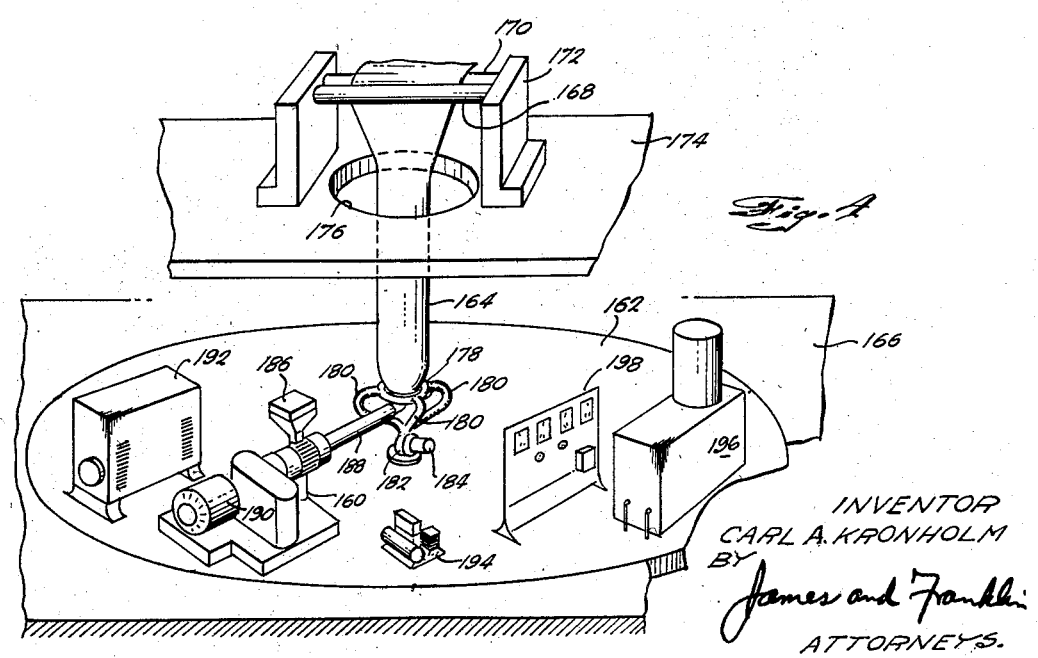
Fig. 4 is a schematized perspective view of a modified form of apparatus embodying features of my invention.

Such a modification of the invention is illustrated in Fig. 4 in which it will be seen that the plastic extruding apparatus, generally designated 160, is mounted on a turn-table 162 for bodily rotation about the axis of the tube 164. The turn-table 162 is located at a lower floor 166, while the pinch rollers 168, 170 are mounted in stationary bearings 172 on an upper floor 174. A large hole 176 is cut through the floor 174 to receive the expanded tube 164 on its way to the pinch rollers.

As before, the outside of the tube 164 is preferably cooled by one or more annular air nozzles 178. This is supplied with air through a suitable manifold system 180 from a blower 182 driven by a motor 184. This blower system may be mounted directly on the turntable 162, and in that case will rotate with the turntable. The extruder 160 may be conventional in comprising a hopper 186 and a heated sleeve 188 through which the plastics material is forced, as by means of a screw or plunger mechanism driven by a suitable motor 190.

If desired a motor generator set 192 may be provided to supply D. C. power to the motors. An air compressor unit is shown at 194, and may be employed to supply air inside the tube 164 in order to inflate and expand the same, all as previously described. Here again the die is preferably provided with an outlet as well as an inlet, and the air trapped within the tube is preferably changed or circulated.

A water supply tank and circulating mechanism may be provided, as shown at 196, for cooling water for the extruder. Electrical controls may be mounted on a suitable panel 198. It will be understood from the drawing that these units, if desired, may all be mounted on the turntable 162 for rotation therewith.

The mechanism for driving the turntable 162 is not shown in Fig. 4, but it will be understood that this mechanism may be substantially the same as that shown in the upper part of Fig. 1 of the drawing. Specifically, the turntable may rest on rings of rollers or caster wheels which support the weight of the turntable and facilitate rotation thereof. Unlike the turntable shown in Fig. 1, that shown in Fig. 4 may be centered by means of a central pivot. The drive of the turntable may be by means of a motor with reduction gear and pneumatic friction wheel, all as described in connection with Fig. 1.

The apparatus shown may be used to produce films of varying thickness and width. The film is quite thin, being of the order of, say, 0.0015" thickness. The flattened tube as wound up on a roll may vary from, say, 3" to 54" in width. The speed of turning of the turntable is quite low, it being a matter of 0.008 to 0.5 revolution per minute.

The continuous changing of the air within the tube helps overcome difficulty arising from a marked difference in temperature on the outside and on the inside of the tube.

It is believed that the construction and method of use of my improved plastic film extrusion apparatus, as well as the advantages thereof, will be apparent from the foregoing detailed description. It will also be apparent that while I have shown and described the invention in two alternative forms, changes may be made in the structures shown, without departing from the scope of the invention, as sought to be defined in the following claims. In the claims the terms "revolve" or "rotate" are not intended to exclude partial rotation, or more specifically oscillation. They are not intended to be limited to continuous rotation in one direction.

I claim:

1. Plastic film extrusion apparatus comprising in combination: a stationary die shaped to form plastic material into thin walled tubing; means for forcing the material through said die; stationary means for applying a sleeve of cooling air to the exterior walls of the plastic tubing shortly after extrusion thereof from said die; pinch rollers spaced a substantial distance from said die to receive and flatten the tubing; means for winding into a roll thereof the flattened tubing after it passes between said pinch rollers; and means for continuously revolving said pinch rollers together with said winding means about the axis of the tubing as extruded from the die.

2. Plastic film extrusion apparatus comprising in combination: a stationary die shaped to form plastic material into thin walled tubing; means for forcing the material through said die; stationary means for applying a sleeve of cooling air to the exterior walls of the plastic tubing shortly after extrusion thereof from said die; pinch rollers spaced a substantial distance from said die to receive and flatten the tubing; a pair of converging forming plates for engaging the tubing shortly in advance of the pinch rollers to preliminarily flatten the tubing; means for winding into a roll thereof the flattened tubing after it passes between said pinch rollers; and means for continuously revolving said pinch rollers together with said forming plates and said winding means about the axis of the tubing as extruded from the die.

3. Plastic film extrusion apparatus comprising in combination: a stationary die shaped to form plastic material into thin walled tubing; means for forcing the material through said die; stationary means for applying a sleeve of cooling air to the exterior walls of the plastic tubing shortly after extrusion thereof from said die; pinch rollers spaced a substantial distance from said die to receive and flatten the tubing; a pair of converging forming plates for engaging the tubing shortly in advance of the pinch rollers to preliminarily flatten the tubing; means for winding into a roll thereof the flattened tubing after it passes between said pinch rollers; and means for continuously revolving said pinch rollers together with said forming plates and said winding means about the axis of the tubing as extruded from the die, the tubing being self-supporting and maintained free of contact with any solid objects after leaving said die and until engaged by said forming plates.

4. Apparatus for the extrusion of plastic film preliminary to the eventual winding thereof on a roller, which comprises an extruder with a substantially annular orifice of uniform width for extrusion of a tube, an opening within the enclosure of the orifice for inflation of the tube, means for handling the tube after the plastic has cooled and hardened, said extruder being mounted on means rotatable about a point which lies in line with the axis of the orifice, and means for rotating said supporting means for the extruder about said point substantially 360 degrees in one direction and then substantially 360 degrees in the opposite direction.

5. Plastic film extrusion apparatus comprising in combination: an extruder including a die shaped to form plastic material into thin-walled tubing; means for applying a sleeve of cooling gas to the exterior walls of the plastic tubing shortly after extrusion thereof from said die; pinch rollers spaced a substantial distance from said die and from said means for applying cooling air, to receive and flatten the tubing; means for winding the film product into a roll thereof after it passes between said pinch rollers, the assembly of such pinch rollers and winding means being mounted for relative rotation with respect to the assembly comprising the extruder and gas applying means, said relative rotation being about the axis of the extruded tubing, the gas applying means and extruder however being fixed against relative rotation with respect to each other.

6. Apparatus for the extrusion of plastic film preliminary to the eventual winding thereof as a roll, which comprises: an extruder with a substantially annular orifice of uniform width for extrusion of a tube of the plastic film material; an opening within the enclosure of the orifice for permitting inflation of the tubing; means for applying a sleeve of cooling gas to the exterior walls of the plastic tubing shortly after extrusion thereof from the orifice; means to receive and flatten the tubing after the plastic has cooled and set, said extruder together with said means for applying cooling gas being mounted on means rotatable with respect to said receiving and flattening means and about a point which lies in line with the axis of the orifice; and means for rotating said mounting means about said point, the gas applying means and extruder however being fixed against relative rotation with respect to each other.

References Cited in the file of this patent

UNITED STATES PATENTS

| | | |
|---|---|---|
| 1,809,303 | Mancini | June 9, 1931 |
| 2,323,025 | Formhals | June 29, 1943 |
| 2,607,078 | Grimes | Aug. 19, 1952 |
| 2,632,206 | Pierce | Mar. 24, 1953 |
| 2,668,323 | Johnson | Feb. 9, 1954 |
| 2,697,852 | Bailey | Dec. 28, 1954 |

OTHER REFERENCES

Ser. No. 352,364, Dumont (A. P. C.), published Apr. 27, 1943.